(12) United States Patent
Dzikowicz

(10) Patent No.: US 7,406,001 B1
(45) Date of Patent: Jul. 29, 2008

(54) UNDERWATER ACOUSTIC BEACON AND METHOD OF OPERATING SAME FOR NAVIGATION

(75) Inventor: Benjamin Dzikowicz, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 332 days.

(21) Appl. No.: 11/340,006

(22) Filed: Jan. 17, 2006

(51) Int. Cl.
*H04B 1/02* (2006.01)

(52) U.S. Cl. ........................................ 367/138

(58) Field of Classification Search ............... 367/131, 367/137, 138, 142, 121, 122, 123
See application file for complete search history.

(56) References Cited

U.S. PATENT DOCUMENTS 3,721,950 A * 3/1973 Jorgensen et al. .............. 367/2

FOREIGN PATENT DOCUMENTS

RU 2019826 C * 9/1994

\* cited by examiner

*Primary Examiner*—Dan Pihulic
(74) *Attorney, Agent, or Firm*—James T. Shepherd

(57) ABSTRACT

An underwater acoustic beacon comprises a cylindrical transducer and at least one spiral wavefront transducer aligned along a common central axis. For use in underwater navigation, the cylindrical and spiral wavefront transducers are activated singly and in combination in accordance with a prescribed sequence.

19 Claims, 3 Drawing Sheets

US 7,406,001 B1

UNDERWATER ACOUSTIC BEACON AND METHOD OF OPERATING SAME FOR NAVIGATION

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to acoustic signal sources and navigation, and more particularly to an underwater acoustic beacon and method of operating the beacon for underwater navigation.

BACKGROUND OF THE INVENTION

Current underwater acoustic systems use time-of-flight or interrogation to control underwater vehicle formation "swimming", tracking and/or docking. Time-of-flight systems require the use of arrays of transducers at a reference position along with complicated signal processing computations. Acoustic interrogation systems require two-way communication between a reference position and an object position, a situation that may cause problems for covert operations. Furthermore, the object position (e.g., a moving underwater vehicle) must generally be equipped to establish or determine its own position, which adds to the cost and complexity of the underwater vehicle.

SUMMARY OF THE INVENTION

Accordingly, it is an object of the present invention to provide an underwater acoustic beacon useful in underwater vehicle formation swimming, tracking or docking.

Another object of the present invention is to provide a method of operating an underwater acoustic beacon for passive detection by an underwater vehicle.

Other objects and advantages of the present invention will become more obvious hereinafter in the specification and drawings.

In accordance with the present invention, an underwater acoustic beacon comprises a cylindrical transducer and at least one spiral wavefront transducer. The two transducers are aligned along a common central axis. For use in underwater navigation, the cylindrical and spiral wavefront transducers are activated in accordance with a prescribed sequence during which distinct acoustic signals are generated. These signals are tone bursts of the same frequency and are sent at regular intervals.

In one embodiment, a beacon comprising a cylindrical transducer and a single spiral wavefront transducer is able to determine bearing to one of two positions. In this case, there are three distinct signals, to wit, (i) a first signal generated solely by the cylindrical transducer, (ii) a second signal generated solely by the spiral wavefront transducer, and (iii) a third signal generated by a combination of the cylindrical and spiral wavefront transducers.

In a second embodiment, a beacon comprising a cylindrical transducer and two spiral wavefront transducers is able to determine bearing to a unique position. In this case, there are five distinct signals: (i) a first signal generated solely by the cylindrical transducer, (ii) a second signal generated solely by the first spiral wavefront transducer, (iii) a third signal generated solely by the second spiral wavefront transducer, (iv) a fourth signal generated by a combination of the cylindrical and first spiral wavefront transducers, and (v) a fifth signal generated by a combination of the cylindrical and second spiral wavefront transducers.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
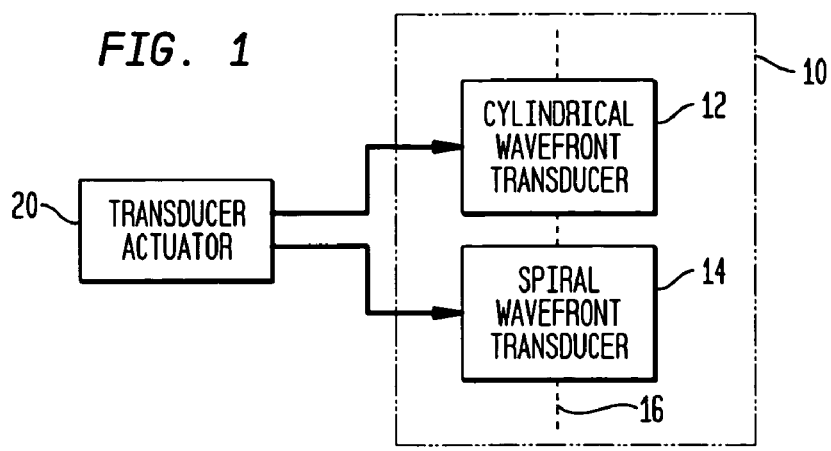
FIG. 1 is a block diagram of an underwater acoustic beacon in accordance with an embodiment of the present invention.
Figure 2:
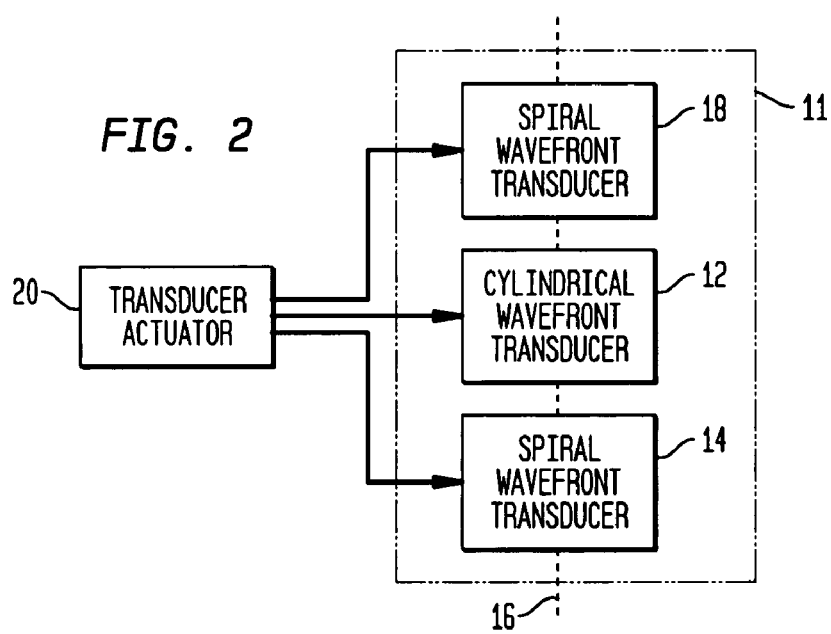
FIG. 2 is a block diagram of an underwater acoustic beacon in accordance with another embodiment of the present invention.

Referring now to the drawings, and more particularly to FIGS. 1 and 2, two embodiments of an underwater acoustic beacon in accordance with the present invention are shown and are referenced generally by numeral 10 (FIG. 1) and numeral 11 (FIG. 2). Each acoustic beacon can be used in a variety of situations where an underwater vehicle is either being tracked or must home in on a position. Regardless of the application, the output of the acoustic beacon is used passively as will be explained further below.

Figure 3:
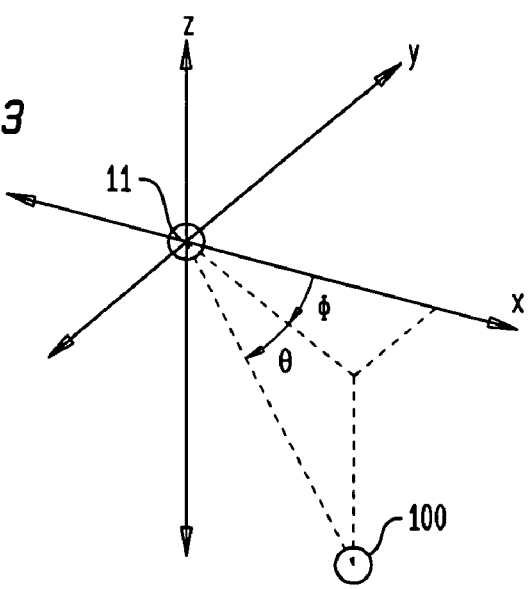
FIG. 3 is a graphic depiction of the aspect and inclination angles between the acoustic beacon and a detection location.

In general, acoustic beacons 10 and 11 utilize two different types of acoustic transducers to generate distinct acoustic signals. Comparison of the amplitudes of the signals at a detection location provide a heading between the beacon and the detection location. The reference frame is illustrated graphically in FIG. 3 where, for example, acoustic beacon 11 is designated as the origin of an (x,y,z) coordinate system and a detection location is indicated by reference numeral 100. A receiver (not shown but typically realized by a hydrophone and a signal processor as would be well understood in the art) located at 100 is able to receive each signal and record their amplitudes. The signals detected at location 100 are processed to determine (i) an aspect angle $\phi$ in the x-y plane between acoustic beacon 11 and detection location 100, and (ii) an inclination angle $\theta$ between beacon 11 and location 100 relative to the x-y plane.

Acoustic beacon 10 employs a cylindrical wavefront transducer 12 and a spiral wavefront transducer 14 to generate three distinct acoustic signals. Transducers 12 and 14 are acoustically isolated from one another (as evidenced by the gap therebetween) and aligned along a common axis 16 about which the acoustic signals will radiate. As would be understood by one of ordinary skill in the art, a transducer actuator 20 is coupled to acoustic beacon 10. Actuator 20 is capable of activating each transducer separately, or both transducers 12 and 14 simultaneously.

Acoustic beacon 11 employs a cylindrical wavefront transducer 12 and two spiral wavefront transducers 14 and 18 to generate five distinct acoustic signals. Transducers 12, 14 and 18 are acoustically isolated from one another, and are aligned along a common axis 16 about which the acoustic signals will radiate. Similar to acoustic beacon 10, a transducer actuator 20 is coupled to acoustic beacon 11. Actuator 20 is capable of activating each transducer separately, both transducers 12 and 14 simultaneously, or both transducers 12 and 18 simultaneously.

When only a single spiral wavefront transducer is used in conjunction with the cylindrical wavefront transducer (i.e., acoustic beacon 10), there are a doublet of solutions. This limits the useful range in $\phi$ to 180°. For many applications this is sufficient. For the beacon to operate over a full 360° in aspect angle $\phi$, a second spiral wavefront transducer is added. The second transducer is "oriented" 90° (or n/2 radians) away from the first transducer as measured about central axis 16. As used herein, transducer orientation can mean a physical orientation of the transducers or an effective orientation achieved by operational control of the transducers as would be understood by one of ordinary skill in the art. In the following paragraphs, operation of acoustic beacon 11 will be described. The single spiral wavefront transducer configuration (i.e., acoustic beacon 10) is easily understood as a simplification having no contribution from the second transducer.

Figure 4:
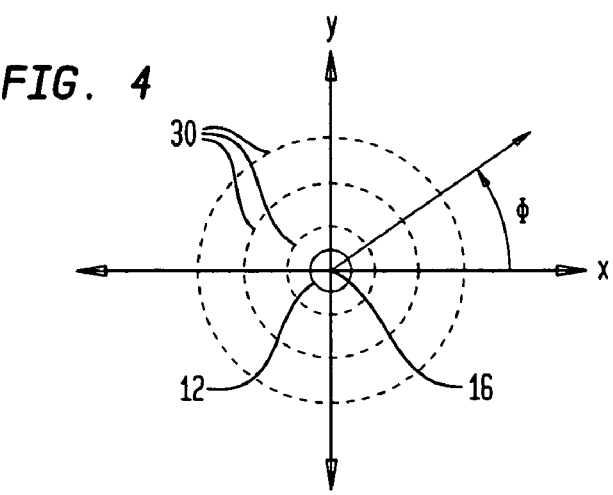
FIG. 4 depicts the cylindrical wavefront of a signal produced by operating a cylindrical wavefront transducer.
Figure 5:
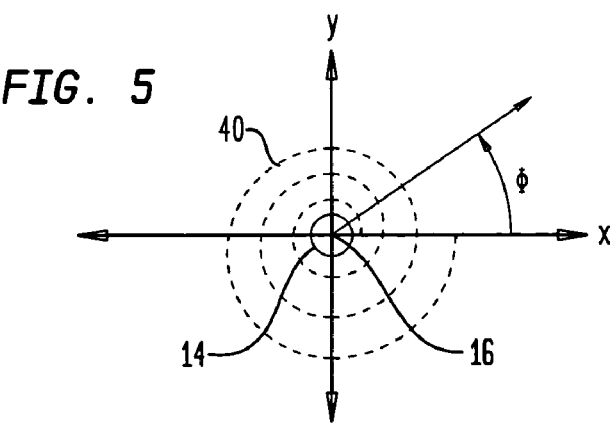
FIG. 5 depicts the spiral wavefront of a signal produced by operating a spiral wavefront transducer.

The wavefronts of the cylindrical and spiral wavefront transducers are shown graphically in FIGS. 4 and 5, respectively as dashed lines. The wavefront of an acoustic signal generated by a cylindrical wavefront transducer of FIG. 4 does not vary with the angle $\phi$. Contrasting this, a spiral wavefront transducer (e.g., transducer 14 or 18) produces a signal whose wavefront 40 varies with $\phi$ as depicted in FIG. 5. For the beacon of the present invention, it is required that each spiral wavefront have a total phase shift of 2n with exactly one rotation about common axis 16.

To determine a heading from a detection location 100 to acoustic beacon 11 in terms of aspect angle $\phi$ and inclination angle $\theta$, acoustic beacon 11 is operated to generate and emit five distinct acoustic signals in the form of tone bursts radiating radially outward with respect to common axis 16. The five distinct acoustic signals are produced by activating just transducer 12 at a frequency f, just transducer 14 at the same frequency f, just transducer 18 at the same frequency f, the simultaneous activation of transducers 12 and 14 at the same frequency f, and the simultaneous activation of transducers 12 and 18 at the same frequency f. Note that in this and all other embodiments of the present invention, the particular order of generating the distinct signals is not a limitation of the present invention. It is only necessary for detection location 100 (where processing will typically occur) to known the order of the prescribed sequence.

Figure 6:
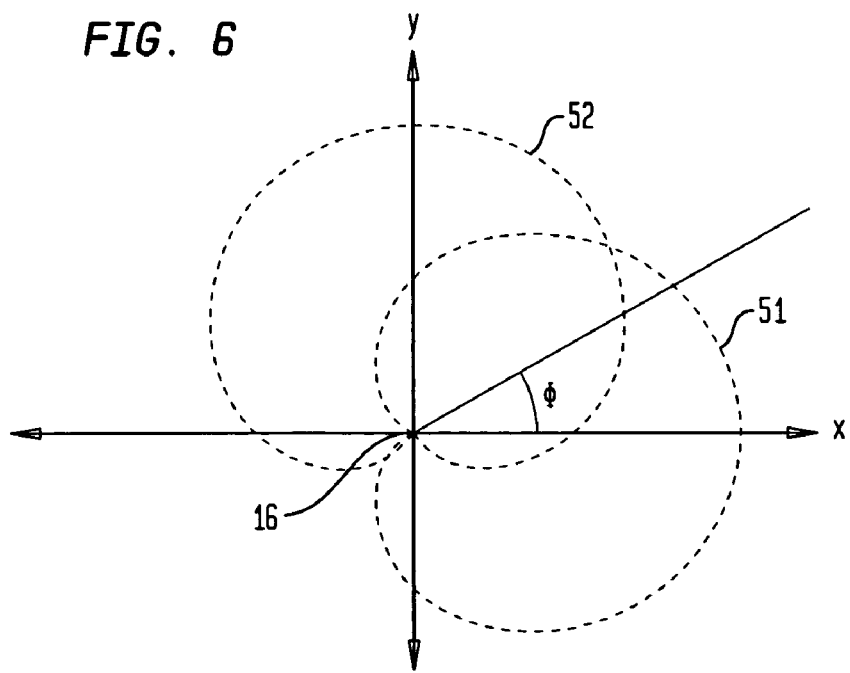
FIG. 6 depicts the relative amplitude of the signal when the cylindrical and spiral wavefront transducers are fired simultaneously.

FIG. 6 is a graphic depiction of the relative amplitude of a signal when cylindrical wavefront transducer 12 and one of spiral acoustic wavefront transducers 14 and 18 are fired simultaneously. Amplitude curve 51 is the contribution from cylindrical wavefront transducer 12, and amplitude curve 52 is the contribution from the simultaneously-fired one of spiral wavefront transducers 14 and 18.

The receiver (e.g., a hydrophone and signal processor) located at detection location 100 need only measure the amplitude associated with each of the above-described distinct acoustic signals in order to determine the heading to acoustic beacon 11 in terms of aspect angle $\phi$ and inclination angle $\theta$. In the illustrated example, the pressure amplitude associated with each of the five acoustic signals as measured at detection location 100 can be written with reference to the phase of the cylindrical wavefront as $$P_C = A(\theta)C(\theta,\phi,r,f)e^{i\phi} \tag{1}$$

$$P_{S1} = B(\theta)C(\theta,\phi,r,f)e^{i\phi} \tag{2}$$

$$P_{S2} = D(\theta)\, C(\theta,\phi,r,f)\, e^{i(\phi+n/2)} \tag{3}$$

$$P_{C+S1} = C(\theta,\phi,r,f)[A(\theta)e^{i\phi}+B(\theta)e^{i\phi}] \tag{4}$$

$$P_{C+S2} = C(\theta,\phi,r,f)[A(\theta)e^{i\phi}+D(\theta)e^{i(\phi+n/2)}] \tag{5}$$

In the above relationships, $P_C$ is the pressure amplitude of the signal generated when just transducer 12 is activated. $P_{S1}$ and $P_{S2}$ are the pressure amplitudes of the signals generated when just a respective one of transducers 14 and 18 is activated. $P_{C+S1}$ and $P_{C+S2}$ are the pressure amplitudes of the combination signals generated when transducers 12/14 and 12/18, respectively, are operated simultaneously. Note the 90° orientation difference between transducers 14 and 18 is reflected as a n/2 phase shift in the exponent. $A(\theta)$, $B(\theta)$ and $D(\theta)$ are the individual amplitude components of the corresponding cylindrical or spiral signals as a function of inclination angle $\theta$, $C(\theta,\phi,r,f)$ is the channel function that varies with detection location 100, where r is the distance between beacon 11 and detection location 100, and f is the frequency of operation of beacon 11. When the distinct acoustic signals are generated close enough in time so that the signal propagation environment has changed little between the signals, the channel function is assumed to be the same for each signal.

Detection of the heading to location 100 can be accomplished by simply comparing ratios of the measured pressure amplitudes. First, the inclination angle $\theta$ is determined by comparing $|P_C|$ with $|P_{S1}|$ or $|P_{S2}|$ where amplitude is denoted by the use of vertical bars. Next, manipulation of the earlier equations yields aspect angle $\phi$ as follows $$\phi = \cos^{-1}[(|P_{C+S1}|-|P_C|)/|P_{S1}|] \tag{6}$$

and $$\phi = \sin^{-1}[-(|P_{C+S2}|-|P_C|)/|P_{S2}|] \tag{7}$$

Due to the nature of the trigonometric functions, each of equations (6) and (7) yields two solutions. For the configuration with only one spiral wavefront transducer (i.e., acoustic beacon 10), only equation (6) is used. For the configuration with two spiral wavefront transducers (i.e., acoustic beacon 11), only one angle will appear as a solution to both equations. This is the advantage gained by adding the additional transducer. For both configurations, the channel functions cancel out of these equations thereby making the ratios constant for a given $\phi$ and $\theta$. In other words, the pressures PC, $P_{S1}$ and $P_{S2}$ serve as reference values while the combined pressure $P_{C+S1}$ and $P_{C+S2}$ can be used to find a phase difference with respect to the reference values. The phase difference is also a function of the distance to the distance to the transducer and these distances vary slightly for each transducer since one lies slightly above the other. These variations can be accounted for by knowing the distance between the transducers and the range to the target.

As described above, a spiral acoustic wavefront is essentially a cylindrical wavefront whose phase changes with aspect angle φ so that one complete revolution about the transducer's central axis produces a total phase shift of 2n. It is to be understood that a variety of transducer structures could be used to generate signals with the property without departing from the scope of the present invention. By way of non-limiting examples, four possible constructions of a spiral wavefront transducer will now be presented wit the aid of FIGS. 7-10.

Figure 7:
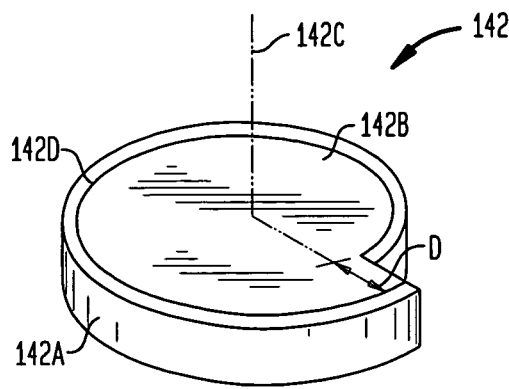
FIG. 7 is a perspective view of an embodiment of a spiral wavefront transducer.

In FIG. 7, a spiral wavefront transducer 142 has a flexible transducer 142A (e.g., a strip of PVDF having electrodes on opposing sides thereof) attached to a rigid base 142B that can be a solid or hollow metal, plastic or composite material. Base 142B has a central axis 142C that will be coincident with the afore-described common axis 16 (FIGS. 1 and 2). An exterior radial surface 142D of base 142B (to which transducer 142A is attached) spirals outward with respect to central axis 142C along a circumferential length. Specifically, over the course of one full spiral revolution about central axis 142C, radial surface 142D spirals through a radial distance D. The length of distance D is designed to be equal to one full wavelength of a sound wave of frequency f (i.e., the operating frequency of beacon 10) when that sound wave is transmitted in the environment of beacon 10 (e.g., water). In operation, when transducer 142A is operated at the designated frequency f, a signal with a spiral acoustic wavefront is generated. This design is simple, inexpensive, and only requires a single drive source. This design will provide a good near field response but is limited to a single operating frequency.

Figure 8:
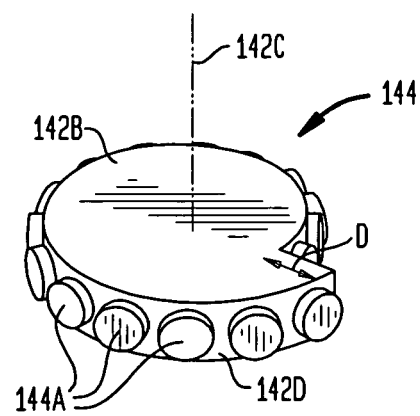
FIG. 8 is a perspective view of another embodiment of a spiral wavefront transducer.

Transducer 144 in FIG. 8 uses a similar base construction to that shown in FIG. 7 as indicated by the use of common reference numerals. However, transducer 144 replaces the flexible transducer with a plurality of piezoelectric transducers 144A distributed about and attached to radial surface 142D. This design is also inexpensive, but can also generate a greater output power than transducer 142. However, the use of discrete transducers 144A means that the near field response of transducer 144 will not be as good as that of transducer 142.

Figure 9:
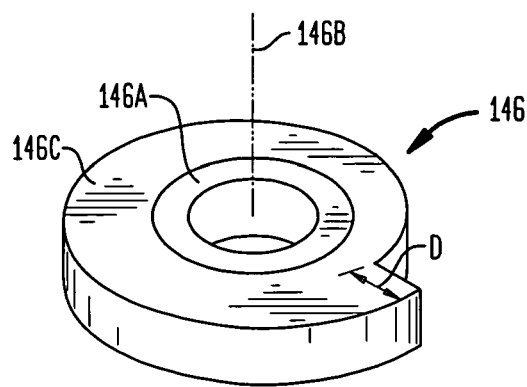
FIG. 9 is a perspective view of another embodiment of a spiral wavefront transducer.

In FIG. 9, a spiral wavefront transducer 146 is characterized by a conventional cylindrical transducer 146A, the central axis 146B of which would be aligned with common axis 16 (FIGS. 1 and 2). Cylindrical transducer 146A is radially encased by acoustic foam 146C that is shaped similarly to the above-described base 142B. Further, foam 146C has an acoustic impedance matching that of the surrounding environment (e.g., water), but a sound speed that is greater than that of the surrounding environment. In this design, the signal with a symmetric cylindrical wavefront generated by cylindrical transducer 146A is phase shifted by the time it exists foam 146C. The amount of phase shift is dependant on the thickness of foam 146C at the wavefront's angle of exit. The advantages of this design include its simplicity, the need for only one driving source, and the ability to change operating frequency by simply changing foam 146C. This design is better suited for higher frequencies of operation as radial distance D may be prohibitively large at lower frequencies.

Figure 10:
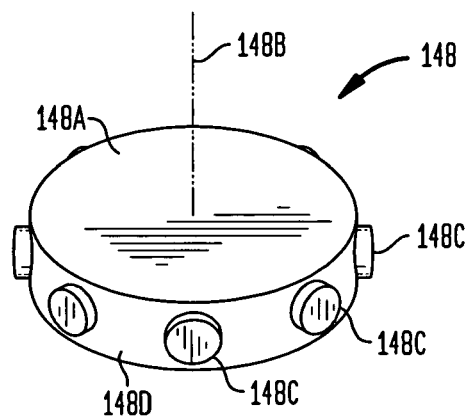
FIG. 10 is a perspective view of an embodiment of a transducer assembly that can be operated as a spiral wavefront transducer.

Finally, a spiral wavefront transducer 148 in FIG. 10 uses a simple cylindrical rigid base 148A with its central axis 148B aligned with common axis 16 (FIGS. 1 and 2). A plurality of conventional piezoelectric transducers 148C are distributed about and attached to the radial surface 148D of base 148A. In this design, the angular dependence of the wavefront is accomplished by activating transducers 148C sequentially and out of phase (based on the transducers' positions on base 148A) so that a total phase shift of 2n is experienced after each of transducers 148C is activated in the sequence.

The advantages of the present invention are numerous. The present invention uses only two types of transducers at the reference location while the detection location(s) requires only a small omnidirectional hydrophone and very simple signal processing. The system is very robust since the effects of the non-linear channel function cancel out.

The present invention can be used to solve a variety of diverse underwater tracking problems. For example, in order to take side-scan or synthetic aperture sonar data over larger areas using autonomous underwater vehicles (AUV), it is advantageous to have the vehicles "swim" in formation with a lead vehicle followed by other vehicles that remain behind and away from the lead vehicle. With the acoustic beacon of the present invention attached to the lead vehicle, the following vehicles could remain locked onto the lead vehicle and simply programmed to follow at a prescribed angle.

Another application of the present invention involves the tracking of a tethered object. As a ship tows a sonar array or some other object, there is interest in knowing the exact location of that object to eliminate the uncertainty due to slack in the towing line. The acoustic beacon of the present invention could be located either on the ship or on the towed body. Note that this application could make use of the simpler acoustic beacon 10 (FIG. 1) since towed objects would typically fall within a 180° swath of aspect angles. Also, since a single can be passed along the tow line, the range could be verified using time-of-flight of the pulses. This would locate the object in three dimensions.

Still another application of the present invention involves AUV docking. Recovery of an AUV to a ship or submarine is a difficult and dangerous procedure requiring divers in the water and/or the hooking of the vehicle with a line. The acoustic beacon described herein could be located near a docking collar or recovery tube below the surface of the water to minimize the effect of sea state. The AUV would simply lock onto the signal and home in on the beacon. With receivers on both ends of the vehicle, the vehicle could even line itself up with the beacon.

Although the invention has been described relative to a specific embodiment thereof, there are numerous variations and modifications that will be readily apparent to those skilled in the art in light of the above teachings. For example, the present invention could be further adapted to use more than two spiral wavefront transducers with the amplitudes being averaged at the detection location. It is therefore to be understood that, within the scope of the appended claims, the invention may be practiced other than as specifically described.

What is claimed as new and desired to be secured by Letters Patent of the United States is:

1. An underwater acoustic beacon, comprising:
   a first transducer for generating a signal with a cylindrical acoustic wavefront when activated;
   at least one second transducer for generating a signal with a spiral acoustic wavefront when activated; and
   said first transducer and said second transducer aligned along a common axis and acoustically isolated from one another.

2. An underwater acoustic beacon as in claim 1 wherein said first transducer comprises a cylindrical transducer having a longitudinal axis aligned with said common axis.

3. An underwater acoustic beacon as in claim 1 wherein each said second transducer comprises:

a rigid base having a central axis aligned with said common axis, said rigid base defining a radial surface that spirals outward a radial distance as said radial surface spirals through one full revolution about said central axis, said radial distance being equal to one full wavelength of a sound wave transmitted in water at a selected frequency; and a single piezoelectric transducer coupled to said radial surface all along a circumferential length thereof wherein, when activated at said selected frequency, said signal with a spiral acoustic wavefront is generated.

4. An underwater acoustic beacon as in claim 1 wherein each said second transducer comprises:

a rigid base having a central axis aligned with said common axis, said rigid base defining a radial surface that spirals outward a radial distance as said radial surface spirals through one full revolution about said central axis, said radial distance being equal to one full wavelength of a sound wave transmitted in water at a selected frequency; and a plurality of piezoelectric transducers coupled to said radial surface and spaced apart from one another therealong wherein, when said piezoelectric transducers are activated simultaneously at said selected frequency, said signal with a spiral acoustic wavefront is generated.

5. An underwater acoustic beacon as in claim 1 wherein each said second transducer comprises:

a cylindrical transducer having a central axis aligned with said common axis; and acoustic foam radially encasing said cylindrical transducer, said acoustic foam having acoustic impedance matched to that of water and having a sound speed of transmission greater than that of water, said acoustic foam defining a radial surface that spirals outward a radial distance as said radial surface spirals through one full revolution about said central axis, said radial distance being equal to one full wavelength of a sound wave transmitted in water at a selected frequency wherein, when said cylindrical transducer is activated at said selected frequency, said signal with a spiral acoustic wavefront is generated at said radial surface of said acoustic foam.

6. An underwater acoustic beacon as in claim 1 wherein each said second transducer comprises:

a rigid cylindrical base having a central axis aligned with said common axis, said rigid cylindrical base defining a radial surface; and a plurality of piezoelectric transducers coupled to said radial surface and spaced apart from one another therealong wherein, when said piezoelectric transducers are activated in an out-of-phase sequence such that the total phase shift for said sequence is 2n, said signal with a spiral acoustic wavefront is generated.

7. An underwater acoustic beacon as in claim 1 further comprising means for activating at a given time (i) just said first transducer, (ii) just one of said at least one second transducer, and (iii) said first transducer and one of said at least one second transducer simultaneously.

8. An underwater acoustic beacon as in claim 1 further comprising means for controlling said first transducer and said at least one second transducer to generate a series of distinct acoustic signals radiating outward with respect to said common axis, said distinct acoustic signals consisting of (i) a first acoustic signal defined solely by said cylindrical acoustic wavefront, (ii) at least one second acoustic signal defined solely by said spiral acoustic wavefront, and (iii) at least one third acoustic signal defined by a combination of said first acoustic signal and one of said at least one second acoustic signal.

9. An underwater acoustic beacon, comprising:

a cylindrical transducer having a central axis;

at least one spiral wavefront transducer having a central axis aligned with said central axis of said cylindrical transducer, wherein each said spiral wavefront transducer comprises:

a rigid base defining a radial surface that spirals outward a radial distance as said radial surface spirals through one full revolution about said central axis of said spiral wavefront transducer, said radial distance being equal to one full wavelength of a sound wave transmitted in water at a selected frequency; and a single piezoelectric transducer coupled to said radial surface all along a circumferential length thereof.

10. An underwater acoustic beacon, comprising:

a cylindrical transducer having a central axis;

at least one spiral wavefront transducer having a central axis aligned with said central axis of said cylindrical transducer, wherein each said spiral wavefront transducer comprises:

a rigid base defining a radial surface that spirals outward a radial distance as said radial surface spirals through one full revolution about said central axis of said spiral wavefront transducer, said radial distance being equal to one full wavelength of a sound wave transmitted in water at a selected frequency; and a plurality of piezoelectric transducers coupled to said radial surface and spaced apart from one another therealong.

11. An underwater acoustic beacon, comprising:

a cylindrical transducer having a central axis;

at least one spiral wavefront transducer having a central axis aligned with said central axis of said cylindrical transducer, wherein each said spiral wavefront transducer comprises:

a second cylindrical transducer centrally aligned along said central axis of said spiral wavefront transducer; and acoustic foam radially encasing said second cylindrical transducer, said acoustic foam having acoustic impedance matched to that of water and having a sound speed of transmission greater than that of water, said acoustic foam defining a radial surface that spirals outward a radial distance as said radial surface spirals through one full revolution about said central axis of said spiral wavefront transducer, said radial distance being equal to one full wavelength of a sound wave transmitted in water at a selected frequency.

12. An underwater acoustic beacon as in claim 9 further comprising means for activating (i) just said cylindrical transducer, (ii) just one of said at least one spiral wavefront transducer, and (iii) said cylindrical transducer and one of said at least one spiral wavefront transducer simultaneously.

13. An underwater acoustic beacon as in claim 9 further comprising means for controlling said cylindrical transducer and said spiral wavefront transducer to generate a series of distinct acoustic signals radiating outward with respect to said central axes thereof, said distinct acoustic signals consisting of (i) a first acoustic signal generated solely by said cylindrical transducer, (ii) at least one second acoustic signal generated solely by one of said at least one spiral wavefront transducer, and (iii) a third acoustic signal generated by a combination of said cylindrical transducer and one of said at least one spiral wavefront transducer.

14. A method of operating an acoustic beacon defined by a cylindrical transducer and at least one spiral wavefront transducer aligned with one another along a common axis of radiation, said method comprising the step of activating said cylindrical transducer and said at least one spiral wavefront transducer in accordance with a prescribed sequence during which distinct acoustic signals are generated, said distinct acoustic signals consisting of (i) a first acoustic signal generated solely by said cylindrical transducer, (ii) at least one second acoustic signal generated solely by one of said at least one spiral wavefront transducer, and (iii) a third acoustic signal generated by a combination of said cylindrical transducer and one of said at least one spiral wavefront transducer.

15. A method according to claim 14 wherein, during said prescribed sequence, a frequency of said distinct acoustic signals is the same.

16. An underwater acoustic beacon as in claim 10 further comprising means for activating (i) just said cylindrical transducer, (ii) just one of said at least one spiral wavefront transducer, and (iii) said cylindrical transducer and one of said at least one spiral wavefront transducer simultaneously.

17. An underwater acoustic beacon as in claim 10 further comprising means for controlling said cylindrical transducer and said spiral wavefront transducer to generate a series of distinct acoustic signals radiating outward with respect to said central axes thereof, said distinct acoustic signals consisting of (i) a first acoustic signal generated solely by said cylindrical transducer, (ii) at least one second acoustic signal generated solely by one of said at least one spiral wavefront transducer, and (iii) a third acoustic signal generated by a combination of said cylindrical transducer and one of said at least one spiral wavefront transducer.

18. An underwater acoustic beacon as in claim 11 further comprising means for activating (i) just said cylindrical transducer, (ii) just one of said at least one spiral wavefront transducer, and (iii) said cylindrical transducer and one of said at least one spiral wavefront transducer simultaneously.

19. An underwater acoustic beacon as in claim 11 further comprising means for controlling said cylindrical transducer and said spiral wavefront transducer to generate a series of distinct acoustic signals radiating outward with respect to said central axes thereof, said distinct acoustic signals consisting of (i) a first acoustic signal generated solely by said cylindrical transducer, (ii) at least one second acoustic signal generated solely by one of said at least one spiral wavefront transducer, and (iii) a third acoustic signal generated by a combination of said cylindrical transducer and one of said at least one spiral wavefront transducer.

* * * * *